(12) United States Patent
Grutter et al.

(10) Patent No.: US 7,909,500 B2
(45) Date of Patent: Mar. 22, 2011

(54) MIXING AND KNEADING MACHINE AND METHOD OF IMPLEMENTING CONTINUAL COMPOUNDING

(75) Inventors: Heini Grutter, Muttenz (CH); Hans-Ulrich Seigenthaler, Suhr (CH)

(73) Assignee: Buss AG (CH)

( * ) Notice: Subject to any disclaimer, the term of this patent is extended or adjusted under 35 U.S.C. 154(b) by 407 days.

(21) Appl. No.: 12/218,928

(22) Filed: Jul. 18, 2008

(65) Prior Publication Data

US 2009/0027994 A1 Jan. 29, 2009

(30) Foreign Application Priority Data

Jul. 25, 2007 (CH) ........................................ 1185/07

(51) Int. Cl.
*B29C 47/44* (2006.01)
(52) U.S. Cl. .............. 366/78; 366/80; 366/90; 366/289; 366/322
(58) Field of Classification Search .................... 366/64, 366/69, 78–80, 88–90, 96–99, 117–118, 366/289, 318, 322, 324; 425/204, 208, 209
See application file for complete search history.

(56) References Cited

U.S. PATENT DOCUMENTS

| | | | | |
|---|---|---|---|---|
| 3,023,455 A | * | 3/1962 | Geier et al. | 425/208 |
| 3,189,324 A | * | 6/1965 | Gubler | 366/90 |
| 3,224,739 A | * | 12/1965 | Schuur | 366/78 |
| 3,347,528 A | * | 10/1967 | Rouner et al. | 366/75 |
| 3,458,894 A | | 8/1969 | Zusammenfassung | |
| 3,841,611 A | * | 10/1974 | Ronner | 366/78 |
| 2007/0183253 A1 | * | 8/2007 | Siegenthaler | 366/80 |
| 2009/0027994 A1 | * | 1/2009 | Grutter et al. | 366/79 |
| 2010/0284236 A1 | * | 11/2010 | Franz et al. | 366/75 |

FOREIGN PATENT DOCUMENTS

| | | |
|---|---|---|
| CH | 278575 A | 7/2007 |
| EP | 1262303 A1 | 12/2002 |
| JP | 09254230 A | 9/1997 |
| JP | 2009029131 A * | 2/2009 |

\* cited by examiner

*Primary Examiner* — Charles E Cooley
(74) *Attorney, Agent, or Firm* — Maginot, Moore & Beck LLP

(57) ABSTRACT

A mixing and kneading machine (1) for continual compounding comprises a screw shaft (3) rotating in a casing 2 and simultaneously moving axially translationally. To sustainably enhance the efficiency of the machine as regards its material thruput per unit of time a screw shaft is proposed having the following geometric ratios:

Da/Di=1.5 to 2.0, i.e. the ratio of screw shaft outer diameter Da to screw shaft inner diameter Di is 1.5 to 2.0, Da/H=4 to 6, i.e. the ratio of screw shaft outer diameter Da to stroke H is between 4 and 6, T/H=1.3 to 2.5, i.e. the ratio of pitch T to stroke H is between 1.3 and 2.5.

The mixing and kneading machine (1) provided with such a screw shaft (3) is operated preferably at a rotational speed exceeding 500 rpm, particularly exceeding 800 rpm.

11 Claims, 2 Drawing Sheets

MIXING AND KNEADING MACHINE AND METHOD OF IMPLEMENTING CONTINUAL COMPOUNDING

REFERENCE TO RELATED APPLICATION

The present application claims priority to Swiss patent application No. 01185/07, filed on Jul. 25, 2007, the disclosure of which is incorporated herein by reference.

BACKGROUND

The invention relates to a mixing and kneading machine for continual compounding including a screw shaft rotating in a casing and simultaneously moving axially translationally and methods of implementing continual compounding by means such a machine.

Mixing and kneading machines of the kind presently involved are employed particularly for compounding bulk-flowable, plastic and/or pasty masses. For example, they serve processing viscous-plastic masses, homogenising and plasticizing plastics, admixing filler and strengthener additives as well as the production of starting materials for the food industry and the chemical/pharmaceutical industry often also involving continual venting, mixing and expansion being integrated. In some cases, mixing and kneading machines may also be employed as reactors.

The working member of the mixing and kneading machine is usually configured as a so-called screw which forwards the material for processing axially.

In conventional mixing and kneading machines the working member merely produces a rotational motion. In addition, mixing and kneading machines are also known in which the working member rotates whilst at the same time moving translationally. The motion profile of the working member is characterized particularly by the main shaft executing a sinusoidal motion overlying the rotation. This motion profile permits casing-mounting such fitted items as kneader pins or kneader teeth. For this purpose the screw is flighted to form discrete kneader vanes. The screw flights—kneader vanes—disposed on the main shaft and the casing-mounted fitted items interact in thus creating the desired shear/mixing and kneading functions in the various processing zones. Such mixing and kneading machines of the last-mentioned kind are known to persons skilled in the art under the trade name Buss KO-KNEADER®.

Mixing and kneading machines of the aforementioned kind are known in which the screw shaft diameter is up to 700 mm, it being particularly the screw shaft diameter that dictates the material throughput in each case. It is usually the case that the ratio of screw shaft outer diameter (Da) to screw shaft inner diameter (Di) is approximately 1.5 whilst the ratio of screw shaft outer diameter (Da) to stroke (translational motion component) (H) is approximately 6.7 and the ratio of pitch (axial spacing of the screw vanes) (T) to stroke (H) is around 2. Depending on the size of the mixing and kneading machine it is run at speeds of 5 to 500 rpm.

Mixing and kneading machines are usually engineered on the principle of geometric similarity. This exists when the ratios Da/Di, Da/H and T/H are constant, no matter what the magnitude.

The factors dictating how good the product being processed is dispersed, mixed and homogenized are the melt temperature, the residence time of the product in the processing space of the machine, the shear rate and the number of shear cycles in the screw channel/processing space filled with the melt.

As applies for many processes, the better the processing zones in sequence such as the infeed, melt, mix, dispersing and vent zones are harmonized as to delivery, shear rate level and fill, the better the product is mixed, dispersed and homogenized. In current state of the art in mixing and kneading machine technology the values usual to standard compounding are mean shear rates in the melt range from 15 l/s to 150 l/s and a mean product residence time over the full extent of the screw from 30 to 600 s.

In conventional mixing and kneading machines the mean shear rate is limited maximally by the rotational speed of the screw and the ratio Da/Di. But, increasing shear rates also result in higher values of the specific energy input which in turn can result in unacceptably high melt temperatures. In conjunction with a long mean residence time of the product in the mixing and kneading machine an excessively high shear rate may also result in deterioration of the product (thermal degradation or cross-linking) diminishing the quality.

SUMMARY

The invention is based on the object of sophisticating a mixing and kneading machine such that its efficiency in terms of material throughput per unit of time can now be enhanced with no appreciable reduction in the quality of the product being processed.

Selecting the geometry of the mixing and kneading machine so that the ratio Da/Di of screw shaft outer diameter Da to screw shaft inner diameter Di is between 1.5 and 2.0, that the ratio Da/H of screw shaft outer diameter Da to stroke H is between 4 and 6 and that the ratio T/H of the pitch T to the stroke H is between 1.3 and 2.5 achieves the basic requirement for optimizing the efficiency of the machine as regards maximum product throughput. A mixing and kneading machine engineered to this defined geometry is particularly suitable for operation at rotational speeds exceeding 500 rpm, it being understood basically that the higher the speed the higher the product throughput.

This defined geometry ensures in addition that the processing zones arranged axially in sequence, especially the infeed zone, melting zone, mixing zone(s) as well as the venting zone can now be optimized, each adapted to the other as to handling capacity, shear rate level and fill to permit attaining mean shear rate ranges enhancing the quality whilst simultaneously shortening the effective duration of peak temperatures in the product.

By selecting the geometry in accordance with the invention the mixing and kneading machine can now be operated directly at high screw speeds in boosting the product throughput per unit of time without resulting in an inadmissibly high specific energy input.

Another object of the invention involves proposing a method of implementing continual compounding by means of a mixing and kneading machine by means of which the material throughput per unit of time can be increased.

To achieve this object it is proposed that the screw shaft is operated at a rotational speed exceeding 500 rpm, particularly exceeding 800 rpm.

Increasing the rotational speed of the screw shaft additionally makes it possible to drastically shorten the product residence time.

The short product residence time of 1 to 20 sec resulting from the high rotary speed of the screw and high product throughput simultaneously diminishes the tendency of the product to degrade thermally or cross-link.

Engineering the mixing and kneading machine in accordance with the invention expands the range of applications for the machine.

BRIEF DESCRIPTION OF THE FIGURES

The invention will now be detailed with reference to the drawings in which.

DESCRIPTION OF ILLUSTRATED EMBODIMENTS

Figure 1:
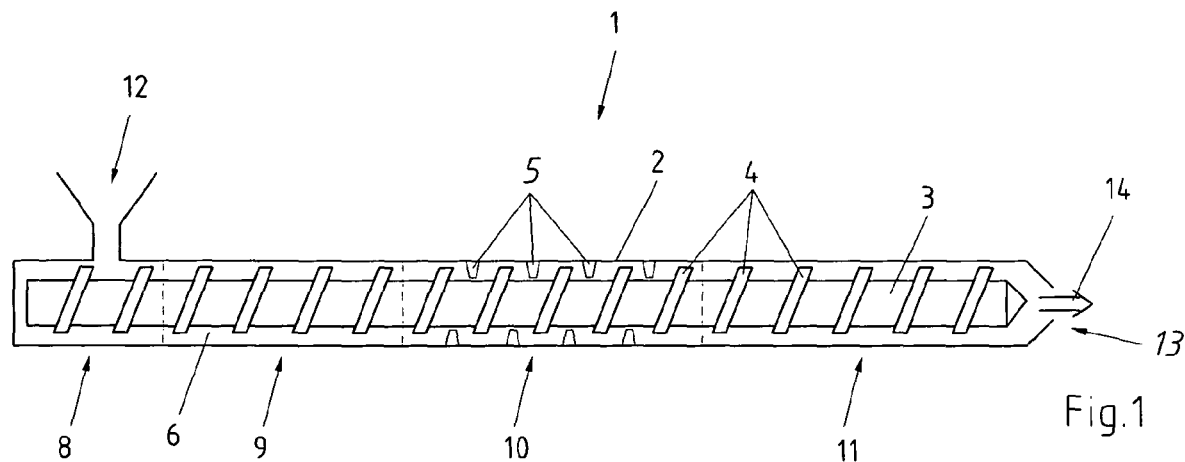
FIG. 1 is a longitudinal section through a mixing and kneading machine shown diagrammatically.

Referring now to FIG. 1 there is illustrated diagrammatically a longitudinal section through a mixing and kneading machine 1. The mixing and kneading machine 1 comprises, surrounded by a casing 2, a working member in the form of a screw shaft 3 provided with a plurality of screw vanes 4 configured spirally. Such a mixing and kneading machine 1 is also termed a single-screw extruder because the machine has just one screw shaft. The screw vanes 4 of the screw shaft 3 are discontinued circumferentially to create axial apertures for the kneader pins 5 arranged at the casing 2 in enabling the screw shaft 3 in addition to its actual rotational motion to also perform an axial, i.e. translational, motion. Formed between the inner side of the casing 2 and the screw shaft 3 is the actual processing space 6 which usually comprises a plurality of processing zones 8-11 in sequence. In the present example the mixing and kneading machine 1 features, for example, an infeed zone 8, a melting zone 9, a mixing/dispersing zone 10 as well as a vent zone 11. At its infeed end the mixing and kneading machine 1 is provided with a hopper 12 whilst at its outfeed end a discharge opening 13 is provided via which the compounded material can exit in the direction of the arrow 14. The basic configuration of such a mixing and kneading machine is known, for example, from Swiss patent CH 278, 575. Although in the example as shown kneader pins 5 are illustrated only in the mixing/dispersing zone 10, kneader pins 5 may, of course, also be provided, as required, in other zones.

Figure 2:
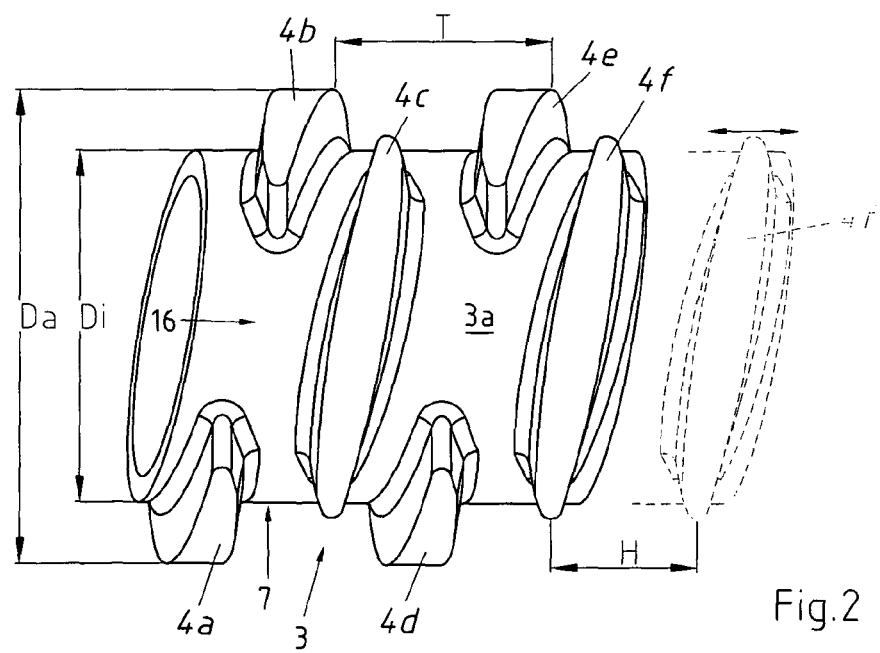
FIG. 2 is a view in perspective showing the geometry of a portion of a screw shaft in accordance with the invention.

Referring now to FIG. 2 there is illustrated the geometry of a portion of a screw shaft 3 in accordance with the invention in perspective. It is to be noted that the shaft geometry of the screw shaft module 3a as shown in this case is not true to scale. The screw shaft 3 is intended for use in a mixing and kneading machine 1 in the form of a so-called single-screw extruder in which the screw shaft 3 is configured as a working member capable of simultaneous rotation and translational motion as is the case with the Buss Ko Kneader® mentioned at the outset. The screw shaft module 3a is provided with a total of eight screw vanes, six of which 4a-4f are evident. Between two screw vanes 4a, 4b in sequence circumferentially a through-hole 16 remains open into which a kneader pin (not shown) arranged at the casing can extend. The inner diameter of the screw shaft 3 is identified as Di whilst the outer diameter of the screw shaft 3 is identified as Da. The inner diameter Di is determined by the outer cylindrical shell surface 7 of the screw shaft 3 whilst the outer diameter Da is determined by the diametral spacing between the highest or outermost portions of the diametrally opposed, axially staggered screw vanes 4a, 4b. The pitch, i.e. the mean distance between two screw vanes 4b, 4e axial in sequences is identified as T. The screw vanes determining the pitch T may also be radially staggered, as may be necessary. The stroke, i.e. the distance covered by the screw shaft 3 axially, is identified as H.

In the present example the side main surfaces of the screw vanes 4a-4f are engineered as free-formed surfaces. Preferably the main surfaces of the kneader pins (not shown) are likewise engineered as free-formed surfaces. A free-formed surface is a surface whose three-dimensional geometry has at no point a natural starting point. Now, because the main surfaces of the screw vanes 4a-4f and/or of the kneader pins are configured at least in part as free-formed surfaces, totally new possibilities are opened up for influencing the static as well as the dynamic screw shaft geometry, for example, as regards the gap remaining between a screw vane and the associated kneader pin. Particularly the size and orientation of this gap can now be varied practically to any degree whilst taking into account the axial motion of the screw shaft overlying the rotational motion. This ultimately now makes it possible to optimize the mechanical energy input and/or the change in the shear and extensional flow zones generated in the processing space and acting on the product being processed.

The ratios pertinent to the screw shaft 3 engineered in accordance with the invention are as follows:

Da/Di=1.5 to 2.0, i.e. the ratio of screw shaft outer diameter Da to screw shaft inner diameter Di is between 1.5 and 2.0;

Da/H=4 to 6, i.e. the ratio of screw shaft outer diameter Da to stroke H is between 4 and 6;

T/H=1.3 to 2.5, i.e. the ratio of pitch T to stroke H is between 1.3 and 2.5.

Tests with the screw shafts engineered in accordance with the invention were performed on Buss Ko kneaders (rotating and simultaneously translational moving single-screw extruders) leaving the structure of the machine (arrangement of the processing zones) principally the same as before for plastics compounding in each case at the usual rotational speeds of 100 to 500 rpm.

It was surprisingly discovered at screw speeds far exceeding 500 rpm that there was no substantial increase in the mass temperature, i.e. the temperature of the product being processed in the machine in the processing zones in which delivery, shear rate level and fill are harmonized.

In operation, such a screw shaft is thus run preferably at speeds exceeding 500 rpm, speeds as high as 800 to even as high as 2000 rpm being achievable without the product being compounded suffering.

Preferably the pitch of the screw vanes 4a-4f is adapted to the length of the processing space 6 (FIG. 1) such that the residence time of the product in the machine is 20 seconds, at the most, when the screw shaft 3 is operated at the rotational speeds exceeding 500 rpm.

Figure 3:
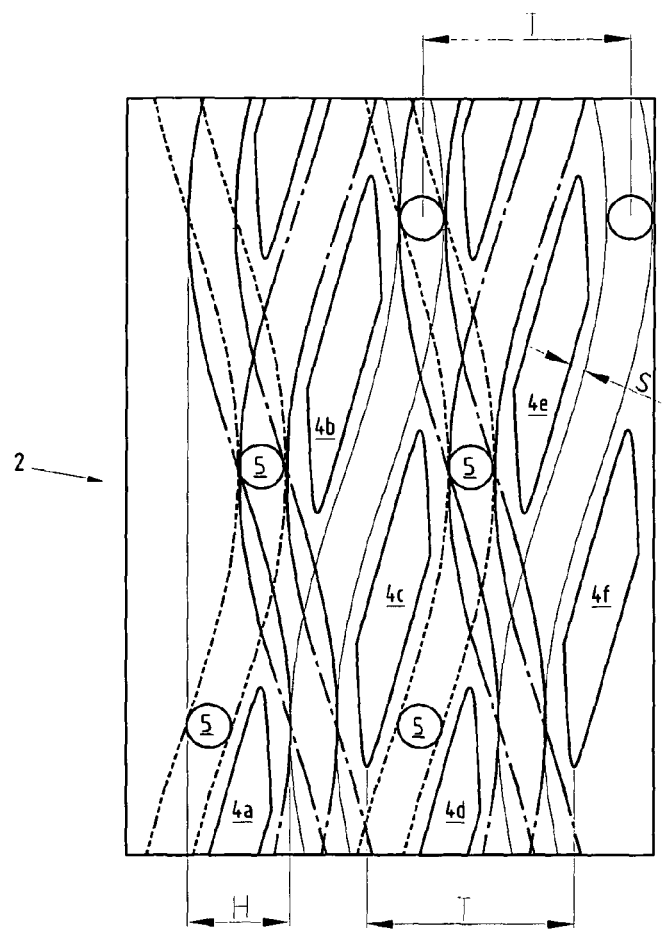
FIG. 3 is a diagrammatic illustration showing the motion of a kneader pin relative to a conventional screw vane.

Referring now to FIG. 3 there is illustrated simplified the motion sequence of the screw shaft in translational motion, showing the inner side of the casing and respectively the shell surface of the working space full length, indicating only the screw vanes 4a, 4b, 4c. For the sake of simplicity the kneader pins 5 are depicted as round members. Evident from FIG. 3 is the motion of each screw vane 4a, 4b, 4c relative to each bordering kneader pin 5. To make for a better overview the sequence in the motion is indicated kinematically reversed, i.e. the screw vanes 4a, 4b, 4c are assumed to be stationary whilst the kneader pins 5 are in motion over a sinusoidal path resulting from the rotational motion of the screw shaft and the overlying translational motion. As evident from this illustration there remains between the two side main surfaces of a screw vane 4c and the passing kneader pins 5 a free space S in the form of a gap, the width and orientation of which is determined by the geometry of the screw vane 4c, the associated kneader pins 5 and the axial displacement of the rotating working member. Likewise indicated is the pitch T corresponding to the spacing between two axially juxtaposed kneader pins 5 and screw vanes 4c, 4f respectively. Also indicated is the stroke H of the screw shaft.

Figure 4:
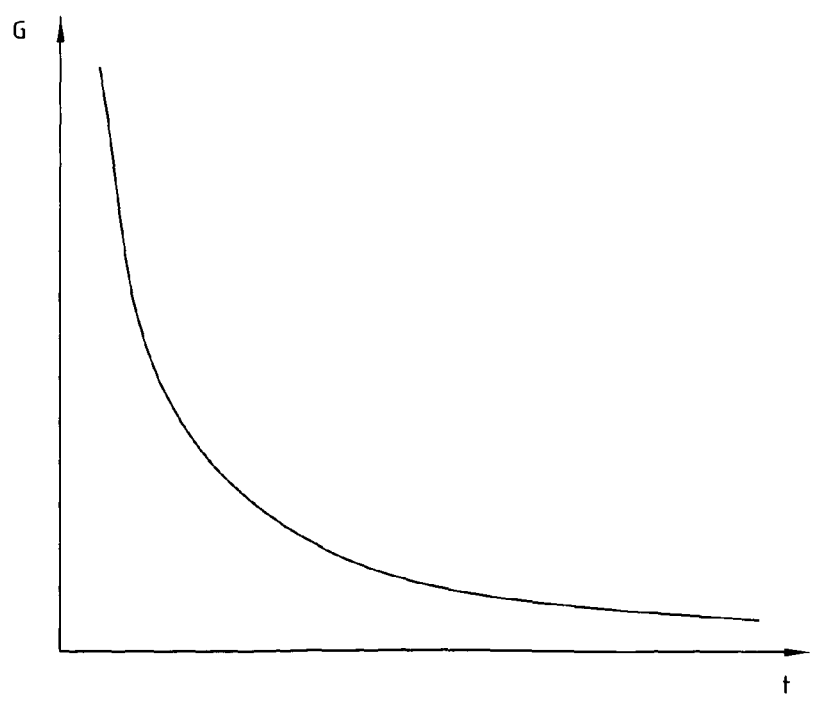
FIG. 4 is a graph plotting the throughput as a function of the mean residence time in the mixing and kneading machine.

Referring now to FIG. 4 there is illustrated the throughput G (kg/h) as a function of the residence time t (seconds) of a product being processed in the mixing and kneading machine. It is obvious from this graph how with increasing throughput the duration of the product being exposed to high temperatures is significantly reduced.

Tests performed have shown that even with a mass temperature, which by experience hitherto would have to result in a reduction in quality, is now safe for quality when the duration of effect is short enough. Achieving a sufficiently short residence time is, however, only possible with an increased throughput.

Throughput and quality of the compounded product in these considerations depend on the geometry of the screw employed, its rotational speed and delivery characteristic of the individual processing zones of the machine.

The object of any compounding is to achieve a homogenous end product, as a rule compounded with additives. This is why the additives and any lack of homogeneity need to be dispersed and distributively intermixed in the machine. To break down particles the shear stress needs to be varied in being transferred to the particles via the surrounding matrix.

The shear stress tau is given by:

$$\tau = \eta * \dot{\gamma} \quad (1)$$

where $\eta$ is the viscosity of the matrix medium and the shear rate resulting there $\dot{\gamma}$. One factor for how good the product to be processed is dispersed, mixed and homogenized is thus, in addition to the melt temperature and the residence time the shear rate $\dot{\gamma}$ (l/sec) in the melt-filled screw channel.

Considering this simplified as the mean value of the quotient screw peripheral velocity/shear gap then (supposing 100% fill of the screw channel) many processes are governed by:

$$\dot{\gamma} = \frac{v_u}{s} = \frac{D_o * \pi * n_s}{s} \quad (2)$$

A balanced shear rate level results in how well mixing, dispersion and homogenization is achieved optimally. In current state of the art in mixing and kneading machine technology the usual values in standard compounding are mean shear rates in the melt range from 20 l/s to 150 l/s and a mean product residence time over the full extent of the screw from 30 to 600 s.

In conventional mixing and kneading machines the mean shear rate as evident from equation (2) is limited maximally by the rotational speed of the screw and by Da/s.

But, increasing shear rates, because of:

$$e_{spec} = 1 \frac{1}{\rho_s} * \eta_{(\gamma)} * \gamma^2 * t \quad (3)$$

also results in higher values of the specific energy input especially which in turn can result in unacceptably high melt temperatures since the increase in temperature of the melt is given by the equation:

$$\Delta T = \frac{e_{spec}}{c_p} \quad (4)$$

where $c_p$=specific enthalpy. In other words in conjunction with a long mean residence time of the product in the mixing and kneading machine an excessively high shear rate may also result in degradation of the product (thermal degradation or cross-linking) diminishing the quality.

The mixing and kneading machine in accordance with the invention can be operated at rotational speeds from 500 to 2000 rpm of the screw shaft in a combination of rotation and translational motion because mean shear rates enhancing the quality can now be achieved whilst shortening the duration of peak temperatures in the product due to adapting the ratios Da/Di, Da/H and T/H as proposed.

Symbols as used:

| | |
|---|---|
| $e_{spec}$: | mean specific energy input (KWh/kg] |
| t: | mean residence time of product in the extruder [s] |
| p: | melt density [kg/m^3] |
| $\gamma$: | mean shear rate [1/sec] |
| $\eta$: | mean dynamic viscosity [Pa * sec] |
| Da: | screw shaft outer diameter [mm] |
| Di: | screw shaft inner diameter [mm] |
| S: | mean shear gap between screw vane and kneader pin/tooth |
| ns: | rotational speed of screw [rpm] or [1/s] |
| vu: | peripheral velocity of screw shaft [m/s] |
| $\tau$: | shear stress [N/mm^2] |
| cp: | specific enthalpy [kJ/kg * K] |
| G: | throughput [kg/h] |
| $\Delta T$: | mass temperature increase [K] |

The invention claimed is:

1. A mixing and kneading machine (1) for continual compounding including a screw shaft (3) rotating in a casing (2) and simultaneously moving axially translationally, characterized in that the ratio Da/Di of screw shaft outer diameter to screw shaft inner diameter is between 1.5 and 2.0, that the ratio Da/H of screw shaft outer diameter Da to stroke H is between 4 and 6 and that the ratio T/H of the pitch T to the stroke H is between 1.3 and 2.5, whereby the screw shaft (3) is operated at a rotational speed exceeding 500 rpm.

2. The mixing and kneading machine (1) as set forth in claim 1, characterized in that the screw shaft (3) is adapted to be operated at a rotational speed exceeding 800 rpm.

3. The mixing and kneading machine (1) as set forth in claim 1, characterized in that the mixing and kneading machine (1) comprises in the conveying direction a plurality of zones in sequence forming a processing space (6).

4. The mixing and kneading machine (1) as set forth in claim 3, characterized in that the processing space (6) is formed by at least one infeed zone (8), a melting zone (9), a mixing/dispersing zone (10) as well as a vent zone (11).

5. The mixing and kneading machine (1) as set forth in claim 3, characterized in that the rotational speed of the screw shaft (3) is adapted to the length of the processing space (6) such that the product residence time in the machine is between 1 and 20 seconds.

6. The mixing and kneading machine (1) as set forth in claim 3, characterized in that the pitch of the screw vanes (4) is adapted to the length of the processing space (6) such that the product residence time in the machine at rotational speeds of the screw shaft (3) exceeding 500 rpm is maximally 20 seconds.

7. The mixing and kneading machine (1) as set forth in claim 1, the mixing and kneading machine (1) being provided with kneader pins (5) secured to the casing (2) which protrude into the processing space (6), characterized in that the main surfaces of the screw vanes (4) and/or of the kneader pins (5) are configured at least in part as free-formed surfaces.

8. The mixing and kneading machine (1) as set forth in claim 7, characterized in that the three-dimensional geometry of the main surfaces of the screw vanes (4) and/or of the kneader pins (5) is/are configured at least in part such that they have at no point a natural starting point.

9. A method of implementing continual compounding by means of a mixing and kneading machine (1) configured as set forth in claim 1, characterized in that the screw shaft is rotated at a rotational speed exceeding 800 rpm.

10. The method as set forth in claim 9, characterized in that the rotational speed of the screw shaft is adapted such that the mean product residence time in the machine (1) is between 1 and 20 seconds.

11. The method as set forth in claim 9, characterized in that bulk-flowable, plastic and/or pasty masses are prepared.

\* \* \* \* \*